United States Patent
Liu et al.

(10) Patent No.: US 10,120,563 B2
(45) Date of Patent: Nov. 6, 2018

(54) USER INTERFACE FOR LIQUID CONTAINER

(71) Applicant: Intel Corporation, Santa Clara, CA (US)

(72) Inventors: Zhanglin Liu, Beijing (CN); Jiqiang Song, Beijing (CN); Chao Zhang, Beijing (CN); Ying Gao, Beijing (CN); Dennis Luan, Shanghai (CN); Haibing Xie, Shenzhen (CN); Dongping Jony Liu, Shenzhen (CN); Randolph Wang, Santa Clara, CA (US); Bin Luo, Shenzhen (CN); Ho Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 14/779,524

(22) PCT Filed: Dec. 24, 2014

(86) PCT No.: PCT/CN2014/094767
§ 371 (c)(1),
(2) Date: Sep. 23, 2015

(87) PCT Pub. No.: WO2016/101160
PCT Pub. Date: Jun. 30, 2016

(65) Prior Publication Data
US 2017/0192664 A1 Jul. 6, 2017

(51) Int. Cl.
*G06F 3/00* (2006.01)
*G06F 3/0488* (2013.01)
(Continued)

(52) U.S. Cl.
CPC ......... *G06F 3/04883* (2013.01); *A47G 19/14* (2013.01); *G06F 1/1643* (2013.01);
(Continued)

(58) Field of Classification Search
CPC ............. G06F 17/5004; G06F 17/5086; G06F 3/04883; G06F 17/30029; G06F 17/30035;
(Continued)

(56) References Cited

U.S. PATENT DOCUMENTS 7,195,164 B2 * 3/2007 Patel .................. G06K 7/10801
235/454
9,086,515 B2 * 7/2015 Zhao .................... G02B 6/0041
(Continued)

FOREIGN PATENT DOCUMENTS

| CN | 1185844 | 6/1998 |
|---|---|---|
| CN | 1524211 | 8/2004 |

(Continued)

OTHER PUBLICATIONS

"International Application Serial No. PCT/CN2014/094767, International Search Report dated Sep. 11, 2015", 7 pgs.
"International Application Serial No. PCT/CN2014/094767, Written Opinion dated Sep. 11, 2015", 6 pgs.

*Primary Examiner* — Di Xiao
(74) *Attorney, Agent, or Firm* — Schwegman Lundberg & Woessner, P.A.

(57) ABSTRACT

A container, such as a beverage container or a mug, may include electronics to run applications. In some examples, the container may include a display for visually displaying icons, menus, data, and other elements. In some examples, the container may include one or more sensors, such as touch sensitivity built into the display or a separate touch-sensitive panel, and/or a motion sensor. In some examples, the container may use the one or more sensors to receive (Continued)

input from a user to run interactive applications on the display. In some examples, the container may recognize particular forms of input, such as user swipes in specified directions and/or for specified durations on the touch-sensitive display, and/or motion of the container in specified directions to execute specified commands for the applications. The recognized input may form a user interface for the user.

26 Claims, 7 Drawing Sheets

(51) Int. Cl.
*G06F 3/0482* (2013.01)
*G06F 3/0481* (2013.01)
*G06F 3/041* (2006.01)
*G06F 1/16* (2006.01)
*A47G 19/14* (2006.01)

(52) U.S. Cl.
CPC .......... *G06F 3/0416* (2013.01); *G06F 3/0482* (2013.01); *G06F 3/04817* (2013.01)

(58) Field of Classification Search
CPC .. G06F 17/3005; G06F 1/1652; G06F 3/0346; G06F 3/0412
See application file for complete search history.

(56) References Cited

U.S. PATENT DOCUMENTS

| | | | | |
|---|---|---|---|---|
| 2009/0172597 | A1* | 7/2009 | Mercer | G06F 3/0488 715/840 |
| 2010/0138053 | A1* | 6/2010 | Kollep | A47J 31/407 700/282 |
| 2011/0145764 | A1* | 6/2011 | Higuchi | G06F 3/0482 715/835 |
| 2013/0212529 | A1 | 8/2013 | Amarnath | |
| 2013/0222323 | A1* | 8/2013 | McKenzie | G06F 1/169 345/174 |
| 2014/0298268 | A1* | 10/2014 | Kang | G06F 3/04847 715/841 |
| 2014/0303790 | A1* | 10/2014 | Huang | G06F 19/3475 700/281 |

FOREIGN PATENT DOCUMENTS

| | | |
|---|---|---|
| CN | 101203821 | 6/2008 |
| CN | 102023786 | 4/2011 |
| CN | 102541537 | 7/2012 |
| CN | 102687100 | 9/2012 |
| CN | 102934049 | 2/2013 |
| CN | 103513894 | 1/2014 |
| CN | 103797441 | 5/2014 |
| CN | 104122996 | 10/2014 |
| WO | 2016101160 | 6/2016 |

* cited by examiner

USER INTERFACE FOR LIQUID CONTAINER

This patent application is a U.S. National Stage Application under 35 U.S.C. 371 from International Application PCT/CN2014/094767, filed Dec. 24, 2014, which is hereby incorporated by reference in its entirety.

TECHNICAL FIELD

Embodiments described herein generally relate to containers for liquids. Some embodiments described herein generally relate to beverage containers, such as mugs.

BACKGROUND

There may be instances when it may be cumbersome to run applications on an electronic device. For instance, when a user is holding a mug of coffee, the user may have only one hand free, and may therefore have difficulty running applications from a smart phone while holding the smart phone with the user's one free hand.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A container, such as a beverage container or a mug, may include electronics to run applications. In some examples, the container may include a display for visually displaying icons, menus, data, and other elements. In some examples, the container may include one or more sensors, such as touch sensitivity built into the display or a separate touch-sensitive panel, and/or a motion sensor. In some examples, the container may use the one or more sensors to receive input from a user to run interactive applications on the display. In some examples, the container may recognize particular forms of input, such as user swipes in specified directions and/or for specified durations on the touch-sensitive display, and/or motion of the container in specified directions to execute specified commands for the applications. The recognized input may form a user interface for the user.

Figure 1:
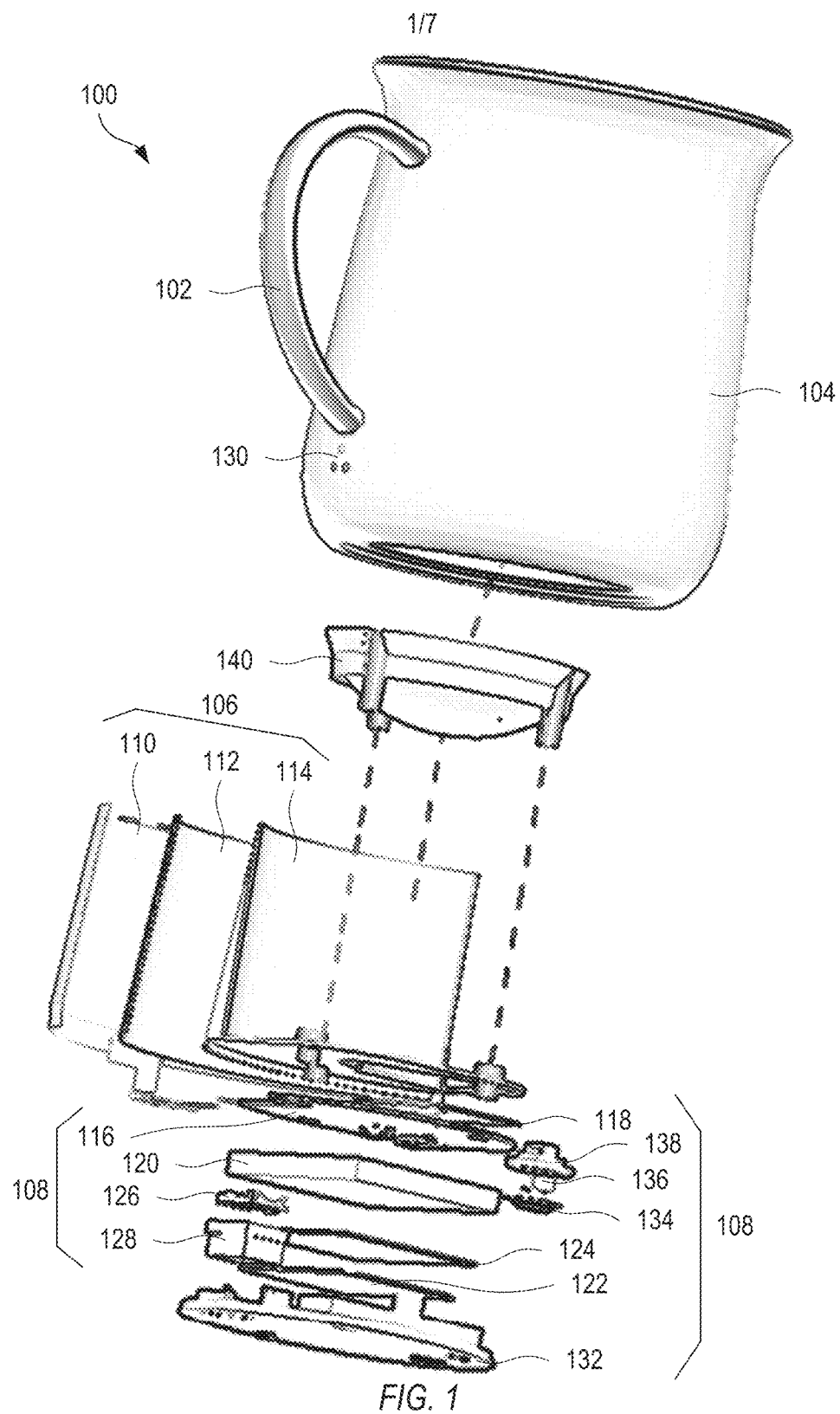
FIG. 1 shows an exploded view of an example of a container shaped to contain liquid, according to an embodiment.

FIG. 1 shows an exploded view of an example of a container 100 shaped to contain liquid, according to an embodiment. The example in FIG. 1 is shaped and sized as a beverage container, such as a mug, but other shapes and sizes may also be used. In some examples, such as the example of FIG. 1, the container 100 includes a handle 102 coupled to an outer surface 104 of the container 100. The configuration of FIG. 1 is but one example; other container configurations may also be used. In some examples, the container 100 may be formed from porcelain. In some examples, the container 100 may be a porcelain mug.

In some examples, the container 100 may include a display 106 accessible from the outer surface 104 of the container 100. In some examples, the display 106 may be touch-sensitive, and may sense swipe patterns. For instance, a user may use a finger, a stylus, or other element to trace a path on the display 106. In some examples where the display 106 is touch-sensitive, the display 106 may be a single touch-sensitive display panel that may extend around a circumference of the container to either side of the handle 102. In other examples where the display 106 is touch-sensitive, the container 100 may include multiple touch-sensitive panels, such as first and second touch-sensitive panels disposed adjacent to the handle 102 and on opposite sides of the handle 102. In some examples, the touch-sensing and display functions may be performed by separate elements, such as one or more touch-sensitive panels and one or more display panels, which may be disposed on suitable locations on the container 100.

In the specific configuration of FIG. 1, display 106 includes a touch-sensitive element 110 disposed at the outer surface 104 of the container 100 or just below the outer surface 104 of the container 100. In the specific configuration of FIG. 1, display 106 further includes an array 112 of light emitting diodes (LEDs) disposed below the touch-sensitive element 110. The LEDs may optionally be grouped as an array of pixels, where each pixel includes individually-controllable red, green, and blue LEDs that may emit light in respective red, green, and blue portions of the electromagnetic spectrum. In the specific configuration of FIG. 1, display 106 further includes an LED holder 114 disposed below the array 112 of LEDs. In some examples, the LED holder 114 may mechanically support the LEDs, and may further include circuitry to drive the LEDs.

In some examples, in which the container 100 is formed from porcelain, the display 106 may take on the visual appearance of the porcelain when the display 106 is inactive. In other words, the display 106, when inactive, may blend into the appearance of the container 100 such that the outer surface 104 of the container 100 includes no indication that it includes a display 106. For example, if the porcelain outer surface 104 of the container 100 is smooth, generally opaque, and is white or another suitable color, then when the display 106 is inactive, the display 106 may also be smooth, generally opaque, and colored to match the outer surface 104 of the container 100. In some examples, the display 106 may be disposed behind a relatively thin layer of porcelain, which may be thin enough so that light from the LEDs is visible through the layer, but thick enough to hide the array 112 of LEDs and the LED holder 114 when the display 106 is inactive. In some examples, the touch-sensitive element 110 may be integrated into the relatively thin layer of porcelain. In some examples, the touch-sensitive element may be disposed behind the relatively thin layer of porcelain.

The configuration of FIG. 1 is but one example for the display 106; other suitable configurations may also be used.

Electronics 108 on or in the container 100 may interpret touch gestures (e.g., swipes) on the touch-sensitive element 110, may provide one or more video signals for display on the array 112 of LEDs, may include a battery for storing energy, may include a recharging element for charging the battery, and may include one or more elements for communicating with other devices or communicating with an outside network.

In some examples where the container 100 includes a touch-sensitive element, such as display 106, the electronics 108 may recognize paths traced on the touch-sensitive element. In some examples, the electronics 108 may determine a swipe direction, may compare the swipe direction to one of a plurality of predetermined directions (such as toward the handle 102, away from the handle 102, "up"; e.g., parallel to the handle 102 and away from a base, "down"; e.g., parallel to the handle 102 and toward the base, and others), may determine if the swipe matches one of the predetermined directions, and if the swipe matches a predetermined direction, may execute a command associated with the predetermined direction. In addition, in some examples, the electronics 108 may determine a swipe duration, may compare the swipe duration to one or more specified threshold durations, and may execute a command based on the swipe duration comparisons.

In some examples, electronics 108 may include a motion sensor to sense motion of the container 100, such as an accelerometer, a capacitive element to sense a motion relative to a base, a video sensor disposed on or in the container, or a video sensor disposed away from the container and having a field of view that includes the container. Other suitable motion sensors may also be used.

The example of FIG. 1 includes a specific configuration for the electronics 108. It will be understood by one of ordinary skill in the art that other suitable configurations may also be used.

In the specific configuration of FIG. 1, electronics 108 includes an input/output board 116. The input/output board 116 may process raw signals from the touch-sensitive element 110 of the display 106, and determine from the raw signals if there is an intentional swipe or touch. The input/output board 116 may also process raw signals from a motion sensor (not shown) disposed on or in the container 100, and may determine from the raw signals if there is an intentional movement of the container 100. The input/output board 116 may also drive the LEDs of the array 112 in the display 106.

In the specific configuration of FIG. 1, electronics 108 includes a swipe/motion recognition board 118, which may receive output from the input/output board 116, and may interpret particular swipes and touches on the display 106 and/or motions of the container 104 as having desired effects as part of the user interface of the container 100.

In the specific configuration of FIG. 1, electronics 108 includes a rechargeable battery 120, which may power the circuitry in the electronics 108 and display 106.

In the specific configuration of FIG. 1, electronics 108 includes a receiver coil 122, which may inductively couple to a corresponding coil in a separate base, and may receive current to recharge the battery 120. In some examples, the separate base may be formed as a saucer, which may connect to a wall outlet or other power source. The saucer may optionally include a charge indicator for the battery 120, such as one or more LEDs.

In the specific configuration of FIG. 1, electronics 108 includes a shielding sheet 124, which may be formed from a conductive material, such as a metal or metal alloy. The shielding sheet 124 may shield the receiver coil 122 from the other circuitry, to avoid interference effects caused by recharging the battery 120.

In the specific configuration of FIG. 1, electronics 108 includes a speaker 126, mechanically supported by a speaker holder 128. The speaker 126 may couple to the input/output board 116 and produce sound audible to a user.

The speaker 126 may be disposed inside a speaker port 130, which may include one or more holes in the outer surface 104 of the container 100. The holes in the speaker port 130 may be small enough to resist liquids, so that the container 100 may be washed, run through a dishwasher, submerged, and so forth.

In some examples, the container 100 may be powered on and off through a bottom 132 of the container 100. In the specific configuration of FIG. 1, electronics 108 includes a top key 134, power switch 136, and switch holder 138.

In some examples, the container 100 includes a mug fixture 140 above the electronics 108, which may mechanically isolate the electronics 108 from the contents of the container 100, and may optionally include a temperature sensor that may monitor the temperature of a liquid inside the container 100.

The configuration of FIG. 1 is but one example for the electronics 108; other suitable configurations may also be used.

Figure 2:
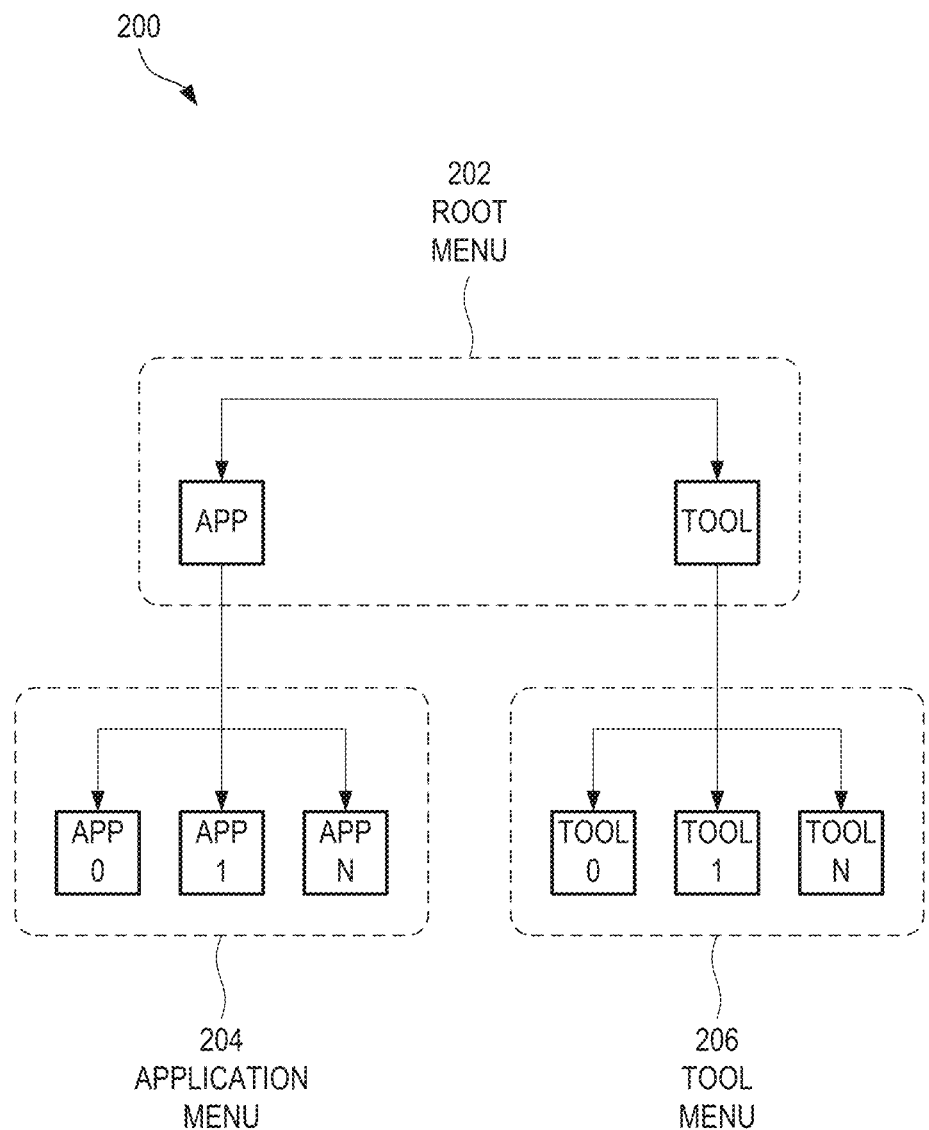
FIG. 2 shows an example of an application hierarchy, which may be executed on the container of FIG. 1, according to an embodiment.

FIG. 2 shows an example of an application hierarchy 200, which may be executed on the container 100 (FIG. 1), according to an embodiment. In some examples, the hierarchy 200 may be executed visually on the display 106. The hierarchy 200 is but one configuration of applications and tools; other suitable configurations may also be used.

When the container 100 is powered up, such as with a power button disposed on the container 100, the display 106 may display a root menu 202. In the example of FIG. 2, the root menu 202 includes two classes of items: applications and tools.

In some examples, applications may connect to a network or another device. For instance, a user may use applications to browse the internet, update social media, check email, and so forth. Applications may also operate detached from a network or another device. For instance, a user may play a game, such as solitaire, without an external connection.

Tools may include device-specific applications, such as those that may configure the container 100, may adjust settings of the container 100, provide troubleshooting for the container 100, and others. In the example of FIG. 2, there are only two classes of items; in other examples, there may be more than two classes.

The root menu 202 presents a user with options to enter an application menu 204 or a tool menu 206. For alternate configurations in which there are more than two classes of item, a user may select a menu for each item from the root menu 206. In some examples, the display 106 may display all or some of the root menu choices, may optionally highlight one of the choices, may optionally switch which one of the choices is highlighted to a different choice, and may optionally select a highlighted choice.

From the root menu, when a user selects the application choice ("APP" in FIG. 2), the display 106 may present the user with an application menu 204. In some examples, the display 106 may display all or some of the application menu choices ("APP 0", "APP 1", . . . , "APP N" in FIG. 2), may optionally highlight one of the choices, may optionally switch which one of the choices is highlighted to a different choice, may optionally select a highlighted choice to run an application, and/or may optionally return to the root menu.

From the root menu, when a user selects the tool choice ("TOOL" in FIG. 2), the display 106 may present the user with a tool menu 206. In some examples, the display 106 may display all or some of the tool menu choices ("TOOL 0", "TOOL 1", . . . , "TOOL N" in FIG. 2), may optionally highlight one of the choices, may optionally switch which one of the choices is highlighted to a different choice, may optionally select a highlighted choice to run a tool, and/or may optionally return to the root menu.

Figure 8:
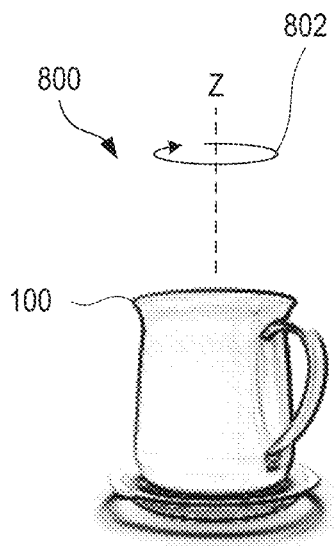
FIG. 8 shows an example of a swirling motion of the container around the longitudinal axis of the container, according to an embodiment.
Figure 9:
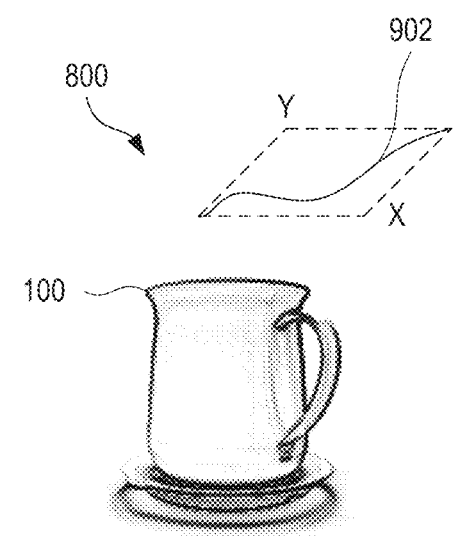
FIG. 9 shows an example of a movement within a plane perpendicular to the longitudinal axis, according to an embodiment.
Figure 10:
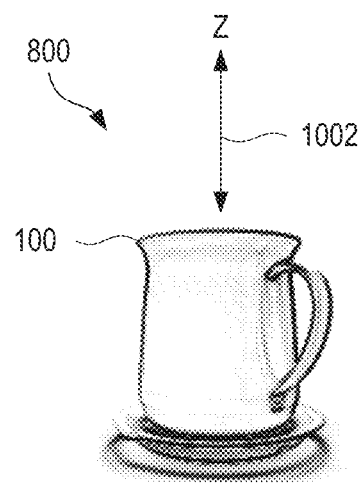
FIG. 10 shows an example of a movement along the longitudinal axis, according to an embodiment.

The container 100 lacks a mouse and keyboard, so navigation through the root menu 202, the application menu 204, and the tool menu 206 may use a dedicated user interface that may receive user input through swiping on a touch-sensitive element, and/or through movement of the container 100. FIGS. 3-7 and the accompanying text show and discuss receiving user input through swiping on a touch-sensitive element. FIGS. 8-10 and the accompanying text show and discuss receiving user input through sensing movement of the container 100. Either of these two mechanisms may be used individually in a device, or both may be used together in the same device.

Figure 3:
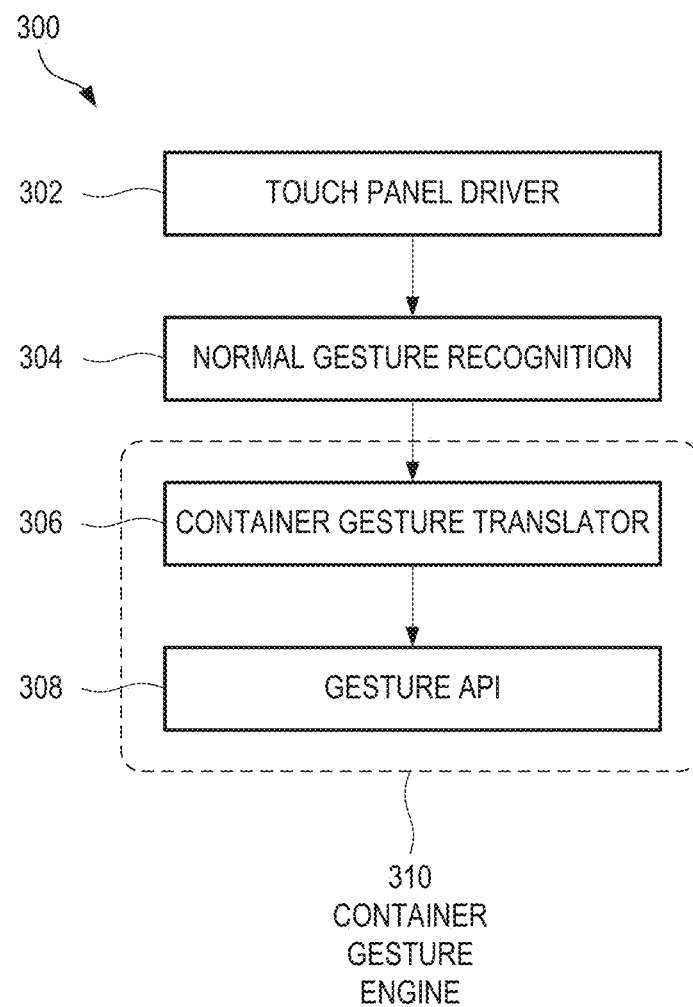
FIG. 3 shows an example of a configuration for a portion of the electronics associated with gesture recognition, according to an embodiment.

FIG. 3 shows an example of a configuration for a portion 300 of the electronics 108 associated with gesture recognition, according to an embodiment. The configuration of FIG. 3 is but one example; other suitable configurations may also be used.

In some examples, such as the example of FIG. 3, a touch panel driver 302 may process a signal from the display 106 to produce a processed signal indicating which portions of the display 106 are being touched and when the portions are being touched.

In some examples, such as the example of FIG. 3, a normal gesture recognition module 304 may analyze the processed signal to look for intentional swipes. For instance, the normal gesture recognition module 304 may look for a touch evolving in time over a region having a specified straightness and length. This is but one example; the normal gesture recognition module 304 may use other suitable criteria for extracting a swipe from the processed signal from the touch panel driver 302.

In some examples, a container gesture translator 306 may translate the extracted swipe into the corresponding interface command. For instance, a swipe in a first direction may correspond to a first interface command, while a swipe in a second direction, different from the first direction, may correspond to a second interface command, different from the first interface command.

In some examples a gesture application programming interface (API) 308 may send and receive information from the container gesture translator 306 and send and receive information from other portions of the electronics 108. The container gesture translator 306 and gesture API 308 may form a container gesture engine 310, which may be accessed from the electronics 108.

FIGS. 4-7 show and discuss examples of swipe directions or durations, and examples of their corresponding interface commands. These are but four examples of swipes and commands; other suitable swipes and commands may also be used. The swipes and commands illustrated in FIGS. 4-7 include single-finger gestures. It is understood that multiple-finger gestures may also be used.

In each of FIGS. 4-7, a system 400 may include a container 100 shaped to contain liquid, and a touch-sensitive display 106 disposed on an outer surface of the container 100 to sense swipe patterns.

The system 400 may further include a user interface module to translate a sensed swipe pattern on the touch-sensitive display 106 into a corresponding interface command. In some examples, the user interface module may include a touch panel driver, such as 302, to process a signal from the touch-sensitive display. In some examples, the user interface module may further include a normal gesture recognition module, such as 304, to extract a swipe from the processed signal from the touch panel driver. In some examples, the user interface module may further include a container gesture translator, such as 306, to translate the extracted swipe into the corresponding interface command. These are but examples; other suitable user interface modules may also be used.

Figure 4:
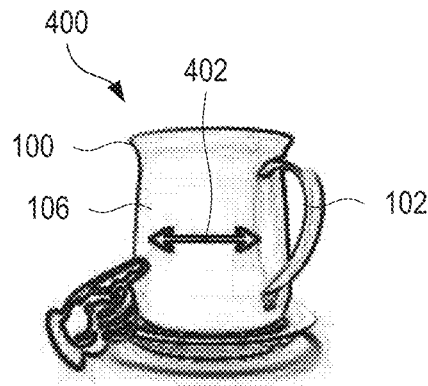
FIG. 4 shows an example of a swipe toward or away from the handle of the container, according to an embodiment.

FIG. 4 shows an example of a swipe 402 toward or away from the handle 102 of the container 100, according to an embodiment.

In some examples, swiping toward or away from the handle 102 may be used to scroll through a menu of icons, where one of the icons is highlighted, and the swiping motion changes which of the icons is highlighted. Swiping in one direction may advance through the icons in one direction; swiping in the opposite direction may advance through the icons in an opposite direction.

In some examples, from the root menu, the user interface module translates the swipe 402 toward or away from the handle into a selection to advance through root icons on the touch-sensitive display 106. The root icons may include an application menu icon and a tool menu icon. For examples in which there are only two root icons, the user interface module may translate the swipe 402 toward or away from the handle 102 into a toggle between displaying an application menu icon on the touch-sensitive display 106 and displaying a tool menu icon on the touch-sensitive display 106. For examples in which the root menu includes more than two icons, the swipe 402 may advance through the root menu icons and may optionally change which of the root menu icons is highlighted.

In some examples, from the application menu, the user interface module translates the swipe 402 toward or away from the handle 102 into a selection to advance through application icons on the touch-sensitive display 106. A swipe toward the handle 102 may advance in one direction through the application icons; a swipe away from the handle 102 may advance in the opposite direction through the application icons.

In some examples, from the tool menu, the user interface module translates the swipe 402 toward or away from the handle 102 into a selection to advance through tool icons on the touch-sensitive display 106. A swipe toward the handle 102 may advance in one direction through the tool icons; a swipe away from the handle 102 may advance in the opposite direction through the tool icons.

These are but four examples of interface commands that may be triggered by a swipe 402 toward or away from the handle 102. Other suitable interface commands may also be used.

Figure 5:
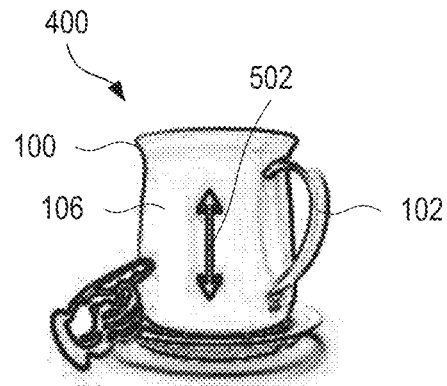
FIG. 5 shows an example of a swipe parallel to the handle of the container, according to an embodiment.

FIG. 5 shows an example of a swipe 502 parallel to the handle 102 of the container 100, according to an embodiment. For typical orientations of the container during use, the swipe 502 is oriented generally vertically.

In some examples, from the root menu, the user interface module translates the swipe 502 parallel to the handle 102 into a repositioning of the root menu on the touch-sensitive display.

In some examples, from the application menu, the user interface module translates the swipe 502 parallel to the handle 102 into a repositioning of the application menu on the touch-sensitive display.

In some examples, from the tool menu, the user interface module translates the swipe 502 parallel to the handle 102 into a repositioning of the tool menu on the touch-sensitive display.

In some examples, the swipe 502 parallel to the handle 102 of the container 100 may be used to duplicate or replace the swipe 402 (FIG. 4) toward or away from the handle 102.

These are but four examples of interface commands that may be triggered by a swipe 502 parallel to the handle 102. Other suitable interface commands may also be used.

Figure 6:
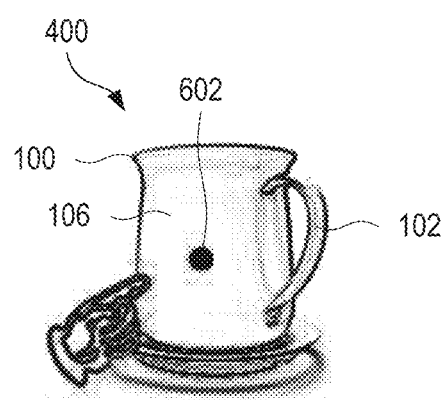
FIG. 6 shows an example of a relatively brief touch on the container, according to an embodiment.

FIG. 6 shows an example of a relatively brief touch 602 on the container, according to an embodiment. For the purposes of this document, touch 602 is considered to be a swipe. In order to discern a deliberate touch, such as 602, from an accidental touch, the electronics may recognize a touch in a single location for a duration that exceeds a first threshold to be the touch 602. In order to discern the relatively brief touch 602 from a prolonged touch (discussed below for FIG. 7), the electronics may recognize a touch in a single location for a duration that exceeds a first threshold but is less than a second threshold to be the touch 602.

In some examples, touching the touch-sensitive display with a relatively brief touch 602 may be used to select a highlighted icon from a menu of icons, and perform a task associated with the selected icon.

In some examples, the user interface module translates the touch 602 on the application menu icon into a selection of an application menu on the touch-sensitive display.

In some examples, from the application menu, the user interface module translates the touch 602 on an application icon into a selection to run a corresponding application on the touch-sensitive display.

In some examples, the user interface module translates the touch 602 on the tool menu icon into a selection of a tool menu on the touch-sensitive display.

In some examples, from the tool menu, the user interface module translates the touch 602 on a tool icon into a selection to run a corresponding tool on the touch-sensitive display.

These are but five examples of interface commands that may be triggered by touch 602 on the container. Other suitable interface commands may also be used.

Figure 7:
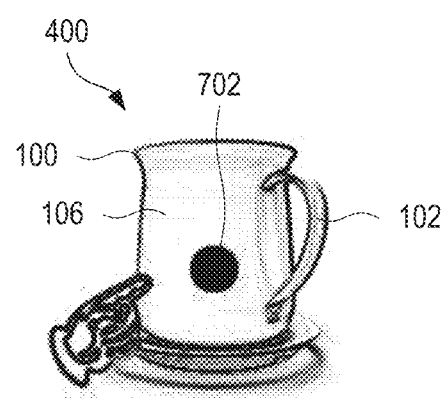
FIG. 7 shows an example of a prolonged touch on the container, according to an embodiment.

FIG. 7 shows an example of a prolonged touch 702 on the container, according to an embodiment. For the purposes of this document, touch 702 is considered to be a swipe. In order to discern a prolonged touch, such as 702, from an accidental touch or from a comparatively brief touch, such as 602, the electronics may recognize a touch in a single location for a duration that exceeds a second threshold, greater than the first threshold, to be the prolonged touch 702.

In some examples, touching the touch-sensitive display with a prolonged touch 702 may exit an application or menu, and return to a menu one level higher than the exited application or exited menu.

In some examples, from a running application, the user interface module translates the prolonged touch 702 on the touch-sensitive display into a selection to exit the running application and return to the application menu on the touch-sensitive display.

In some examples, from the application menu, the user interface module translates the prolonged touch 702 on the touch-sensitive display into a selection to exit the application menu and return to the root menu on the touch-sensitive display.

In some examples, from a running tool, the user interface module translates the prolonged touch 702 on the touch-sensitive display into a selection to exit the running tool and return to the tool menu on the touch-sensitive display.

In some examples, from the tool menu, the user interface module translates a prolonged touch 702 on the touch-sensitive display into a selection to exit the tool menu and return to the root menu on the touch-sensitive display.

These are but five examples of interface commands that may be triggered by prolonged touch 702 on the container. Other suitable interface commands may also be used.

The input contacts 402, 502, 602, 702 of FIGS. 4-7 are but four examples of swipes or touches that may be translated into corresponding interface commands. Other suitable swipes may also be used.

FIGS. 8-10 and the accompanying text show and discuss receiving user input through sensing movement of the container 100 (FIG. 1), according to an embodiment. Sensing container movement may be used instead of sensing swipes, or may be used in combination with any or all of the swipes, such as 402, 502, 602, 702 from FIGS. 4-7.

In each of FIGS. 8-10, a system 800 may include a container 100 shaped to contain liquid. The container 100 may be shaped to define a longitudinal axis (Z), the longitudinal axis (Z) being oriented generally vertically when the container is filled with liquid. In some examples, the container 100 is a porcelain mug.

The system 800 may further include a motion sensor to sense motion of the container 100. The motion sensor may be disposed on or in the container 100, and may optionally be included with the electronics 108. Examples of suitable motion sensors may include at least one of an accelerometer, a capacitive element to sense a motion relative to a base, a sensor based on triangulation with respect to two or more fixed stations, a video sensor disposed on or in the container, a video sensor disposed away from the container and having a field of view that includes the container, and others. The system 800 may further include a user interface module to translate a sensed motion of the container 100 into a corresponding interface command. In some examples, the system may further include further a display, such as 106, disposed on an outer surface of the container 100. In some of these examples, the display may be touch-sensitive; in other examples, the display may lack touch sensitivity.

The system 800 may use the hierarchy 200 to run applications and tools on the display, although other suitable hierarchies may also be used. In the example of FIG. 2, when the container 100 is powered up, the display may display a root menu. The root menu may include a plurality of root icons, and may highlight one of the root icons from the plurality. The root icons may include an application menu icon and a tool menu icon. Selecting the application menu icon may enter an application menu, such as 204, which may display to a user several application icons. One of the application icons may be highlighted. The user may optionally switch which application icon is highlighted. The user may select the highlighted application icon to enter a corresponding application. The user may exit the application to return to the application menu. The user may exit the application menu to return to the root menu. Similarly, the tool menu, such as 206, may present tool icons in a tool menu. The user may optionally select which tool icon is highlighted, may optionally select the highlighted tool icon to enter the corresponding tool, may optionally exit the tool to return to the tool menu, and may optionally exit the tool menu to return to the root menu. In some examples, there may be additional classes in the root menu, in addition to or instead of applications and tools.

The user interface may translate various motions of the container 100 into corresponding interface commands, which may in turn navigate through the menu hierarchy, such as 200. For example, a swirling motion around the longitudinal axis may correspond to a first command, a movement within a plane perpendicular to the longitudinal axis may correspond to a second command, and a movement along the longitudinal axis may correspond to a third command. These are but three examples; other motions may also be used.

FIG. 8 shows an example of a swirling motion 802 of the container 100 around the longitudinal axis (Z) of the container 100, according to an embodiment. In the swirling motion 802, a user may move the container 100 along a circular, elliptical, or generally curved path that surrounds the longitudinal axis (Z). In some examples, the swirling motion 802 does not rotate or pivot the container 100 around the longitudinal axis (Z), so that a user may swirl the container 100 while gripping the container 100 by the handle. In some examples, the diameter of the swirling motion path is less than a diameter of the container 100.

In some examples, the swirling motion 802 may be used to scroll through a menu of icons, where one of the icons is highlighted, and the swirling motion 802 changes which of the icons is highlighted. Swirling in one direction may advance through the icons in one direction; swirling in the opposite direction (i.e., reversing the path along which the container 100 is translated) may advance through the icons in an opposite direction.

In some examples, from the root menu, the user interface module translates a swirling motion 802 around the longitudinal axis (Z) into a selection to highlight a different root icon from the plurality of root icons.

In some examples, from the application menu, the user interface module translates a swirling motion 802 around the longitudinal axis (Z) into a selection to highlight a different application icon from the plurality of application icons.

In some examples, from the tool menu, the user interface module translates a swirling motion 802 around the longitudinal axis (Z) into a selection to highlight a different tool icon from the plurality of tool icons.

These are but four examples of interface commands that may be triggered by a swirling motion 802 of the container 100 around the longitudinal axis (Z) of the container 100. Other suitable interface commands may also be used.

FIG. 9 shows an example of a movement 902 within a plane perpendicular to the longitudinal axis (Z), according to an embodiment. In the geometry of FIG. 9, the movement 902 may be along (X), along (Y), or in a suitable direction within the (X-Y) plane.

In some examples, moving within the (X-Y) plane may be used to select a highlighted icon from a menu of icons, and perform a task associated with the selected icon.

In some examples, from the root menu, the user interface module translates a movement 902 within a plane perpendicular to the longitudinal axis into a selection to select the highlighted root icon and perform an action corresponding to the selected root icon. In some of these examples, the action may include displaying an application menu on the display. In some of these examples, the action may include displaying a tool menu on the display.

In some examples, from the application menu, the user interface module translates a movement 902 within a plane perpendicular to the longitudinal axis into a selection to select the highlighted application icon and start an application corresponding to the selected application icon.

In some examples, from the tool menu, the user interface module translates a movement 902 within a plane perpendicular to the longitudinal axis into a selection to select the highlighted tool icon and start a tool corresponding to the selected tool icon.

These are but four examples of interface commands that may be triggered by a movement 902 within a plane perpendicular to the longitudinal axis. Other suitable interface commands may also be used.

FIG. 10 shows an example of a movement 1002 along the longitudinal axis (Z), e.g., by raising the container 100, according to an embodiment.

In some examples, moving along the longitudinal axis (Z) may exit an application or menu, and return to a menu one level higher than the exited application or exited menu.

In some examples, when an application is running, the user interface module translates a movement 1002 along the longitudinal axis into a selection to exit the application and return to the application menu.

In some examples, from the application menu, the user interface module translates a movement 1002 along the longitudinal axis into a selection to exit the application menu and return to the root menu.

In some examples, when a tool is running, the user interface module translates a movement 1002 along the longitudinal axis into a selection to exit the tool and return to the tool menu.

In some examples, from the tool menu, the user interface module translates a movement 1002 along the longitudinal axis into a selection to exit the tool menu and return to the root menu.

These are but five examples of interface commands that may be triggered by a movement 1002 along the longitudinal axis. Other suitable interface commands may also be used.

Figure 11:
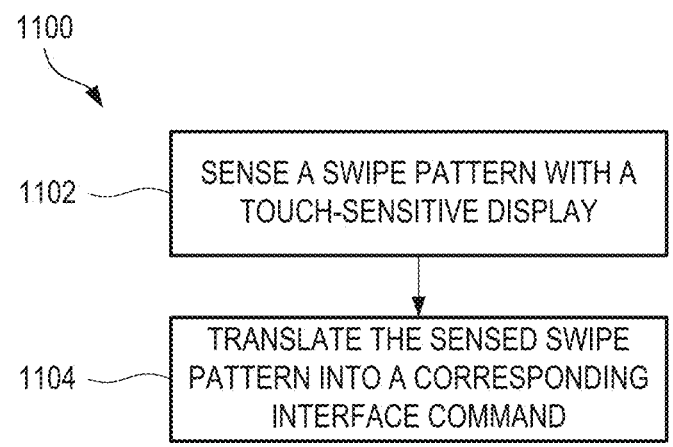
FIG. 11 is a flow chart of an example of a method for receiving an interface command from a container shaped to contain liquid, according to an embodiment.

FIG. 11 is a flow chart of an example of a method 1100 for receiving an interface command from a container shaped to contain liquid, according to an embodiment. Method 1100 may be executed on the container 100 (FIG. 1), or on other suitable containers. In some examples, the container may include a handle coupled to the outer surface of the container. In some examples, container may be a porcelain mug. Method 1100 is but one example; other suitable methods may also be used.

At 1102, a swipe pattern is sensed with a touch-sensitive display disposed on an outer surface of the container. Examples of suitable swipes may include 402 (FIG. 4), 502 (FIG. 5), 602 (FIG. 6), 702 (FIG. 7), and others.

At 1104, the sensed swipe pattern is translated into a corresponding interface command with a user interface module. For swipe 402 (FIG. 4), an example of a suitable interface command is to advance through a menu of icons, pictures, or graphics. For swipe 502 (FIG. 5), an example of a suitable interface command is to reposition elements of a menu on the display. For swipe 602 (FIG. 6), an example of a suitable interface command is to start an application or a tool. For swipe 702 (FIG. 7), an example of a suitable interface command is to exit a running application and return to an application menu, to exit a running tool and to return to a tool menu, or to exit a menu and return to a menu at a level above the exited menu.

In some examples, when the container is powered up, a root menu may be displayed on the touch-sensitive display. In some examples, from the root menu, a swipe toward or away from the handle may be translated into a selection to advance through root icons on the touch-sensitive display. The root icons may include an application menu icon and a tool menu icon.

In some examples, a touch on the application menu icon may be translated into a selection of an application menu on the touch-sensitive display. In some examples, from a running application, a prolonged touch on the touch-sensitive display may be translated into a selection to exit the running application and return to the application menu on the touch-sensitive display. In some examples, from the application menu, a prolonged touch on the touch-sensitive display may be translated into a selection to exit the application menu and return to the root menu on the touch-sensitive display.

In some examples, a touch on the tool menu icon may be translated into a selection of a tool menu on the touch-sensitive display. In some examples, from the tool menu, a swipe toward or away from the handle may be translated into a selection to advance through tool icons on the touch-sensitive display. In some examples, from the tool menu, a touch on a tool icon may be translated into a selection to run a corresponding tool on the touch-sensitive display. In some examples, from a running tool, a prolonged touch on the touch-sensitive display may be translated into a selection to exit the running tool and return to the tool menu on the touch-sensitive display. In some examples, from the tool menu, a prolonged touch on the touch-sensitive display may be translated into a selection to exit the tool menu and return to the root menu on the touch-sensitive display. In some examples, translating the sensed swipe pattern into a corresponding interface command with a user interface module may comprise processing a signal from the touch-sensitive display; extracting a swipe from the processed signal; and translating the swipe into the corresponding interface command.

Figure 12:
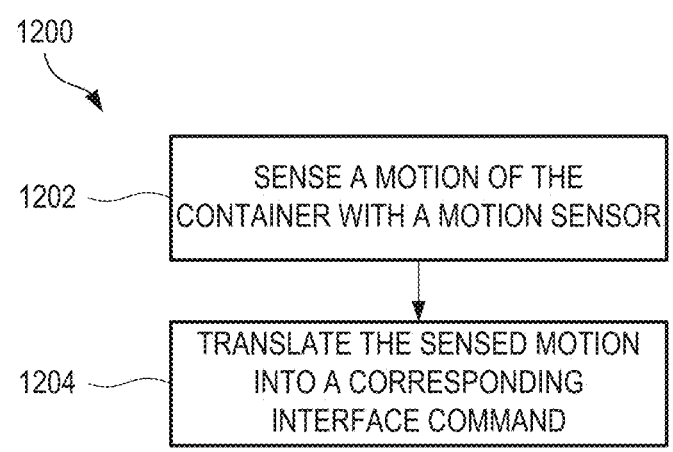
FIG. 12 is a flow chart of an example of another method for receiving an interface command from a container shaped to contain liquid, according to an embodiment.

FIG. 12 is a flow chart of an example of another method 1200 for receiving an interface command from a container shaped to contain liquid, according to an embodiment. Method 1200 may be executed on the container 100 (FIG. 1), or on other suitable containers. In some examples, the container may include a handle coupled to the outer surface of the container. In some examples, container may be a porcelain mug. In some examples, the container may be shaped to define a longitudinal axis, the longitudinal axis being oriented generally vertically when the container is filled with liquid. Method 1200 is but one example; other suitable methods may also be used.

At 1202, a motion of the container is sensed with a motion sensor disposed on or in the container. Examples of suitable motions may include swirling (802; FIG. 8), moving within a plane perpendicular to the longitudinal axis (902; FIG. 9), moving along the longitudinal axis (1002; FIG. 10), and others.

At 1204, the sensed motion is translated into a corresponding interface command with a user interface module.

In some examples, a swirling motion around the longitudinal axis, such as 802 (FIG. 8), may be translated into a first command. For a swirling motion, an example of a suitable interface command is to advance through a menu of elements, such as icons, pictures, or graphics, and switch which element from the menu is highlighted.

In some examples, a movement within a plane perpendicular to the longitudinal axis, such as 902 (FIG. 9), may be translated into a second command. For a motion within a plane perpendicular to the longitudinal axis, an example of a suitable interface command is to select a highlighted element and perform an action associated with the selected element, such as starting an application or starting a tool.

In some examples, a movement along the longitudinal axis, such as 1002 (FIG. 10), may be translated into a third command. For a motion along the longitudinal axis, an example of a suitable interface command is to exit a running application and return to an application menu, to exit a running tool and to return to a tool menu, or to exit a menu and return to a menu at a level above the exited menu.

In some examples, when the container is powered up, a root menu may be displayed on the display. The root menu may include a plurality of root icons. The root menu may highlight one of the root icons from the plurality. In some examples, from the root menu, a swirling motion around the longitudinal axis may be translated into a selection to highlight a different root icon from the plurality of root icons. In some examples, from the root menu, a movement within a plane perpendicular to the longitudinal axis may be translated into a selection to select the highlighted root icon and perform an action corresponding to the selected root icon.

In some examples, the action may comprise displaying an application menu on the display. The application menu may include a plurality of application icons. The application menu may highlight one of the application icons from the plurality. In some examples, from the application menu, a swirling motion around the longitudinal axis may be translated into a selection to highlight a different application icon from the plurality of application icons. In some examples, from the application menu, a movement within a plane perpendicular to the longitudinal axis may be translated into a selection to select the highlighted application icon and start an application corresponding to the selected application icon. In some examples, when the application is running, a movement along the longitudinal axis may be translated into a selection to exit the application and return to the application menu. In some examples, from the application menu, a movement along the longitudinal axis may be translated into a selection to exit the application menu and return to the root menu.

In some examples, the action may comprise displaying a tool menu on the display. The tool menu may include a plurality of tool icons. The tool menu may highlight one of the tool icons from the plurality. In some examples, from the tool menu, a swirling motion around the longitudinal axis may be translated into a selection to highlight a different tool icon from the plurality of tool icons. In some examples, from the tool menu, a movement within a plane perpendicular to the longitudinal axis may be translated into a selection to select the highlighted tool icon and start a tool corresponding to the selected tool icon. In some examples, when the tool is running, a movement along the longitudinal axis may be translated into a selection to exit the tool and return to the tool menu. In some examples, from the tool menu, a movement along the longitudinal axis may be translated into a selection to exit the tool menu and return to the root menu.

The embodiments described above may be implemented in one or a combination of hardware, firmware, and software. Various methods or techniques, or certain aspects or portions thereof, may take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device may include any non-transitory mechanism for storing information in a form readable by a machine (e.g., a computer). In the case of program code executing on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 13:
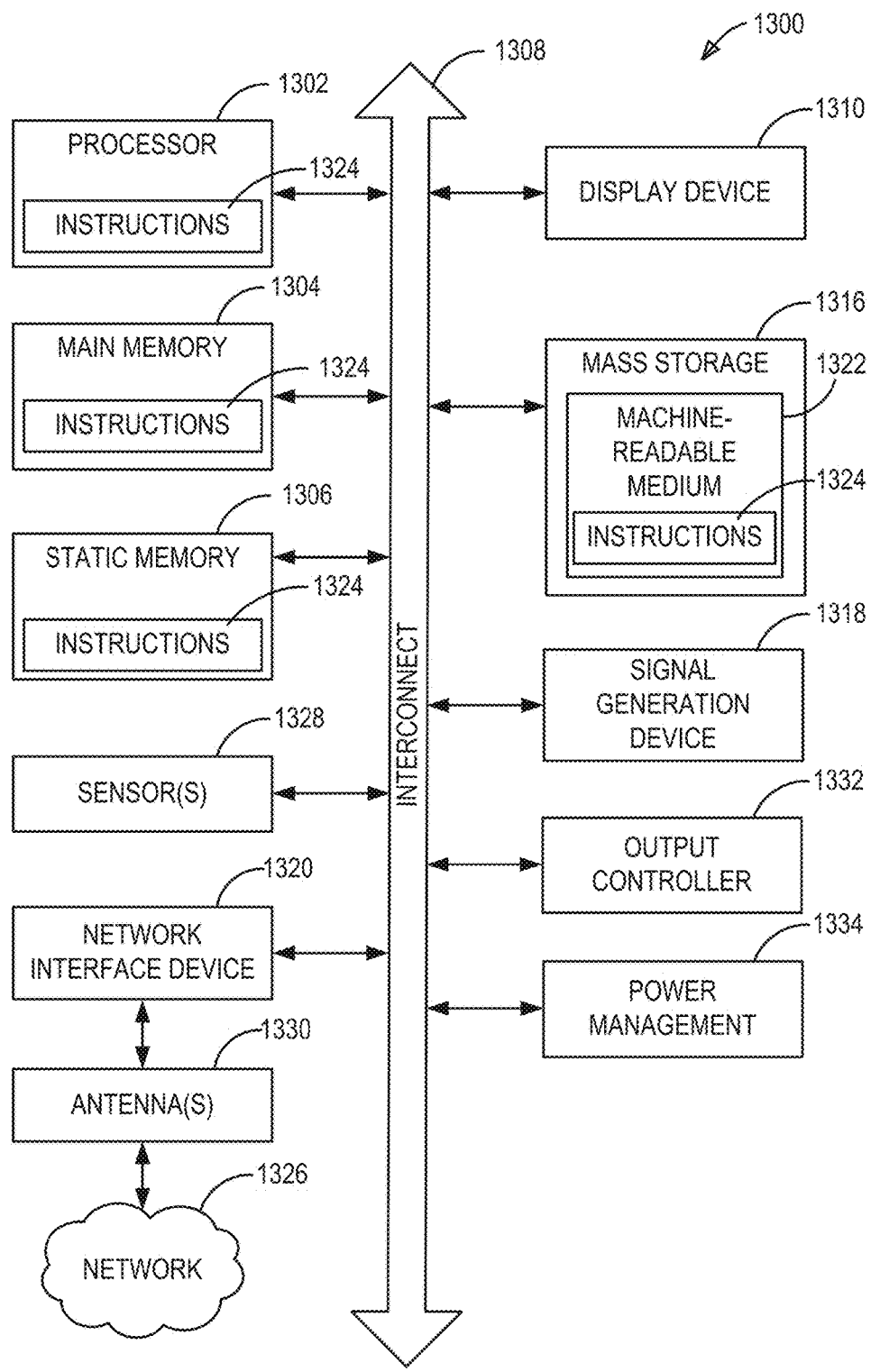
FIG. 13 is a block diagram illustrating an example computer system machine upon which any one or more of the methodologies herein discussed may be run, according to an embodiment.

FIG. 13 is a block diagram illustrating an example computer system machine 1300 upon which any one or more of the methodologies herein discussed may be run. Computer system machine 1300 may be embodied as the container 100, or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. Further, while only a single machine is illustrated, the term "machine" shall also be taken to include any collection of machines that individually or jointly execute a set (or multiple sets) of instructions to perform any one or more of the methodologies discussed herein.

Example computer system machine 1300 includes a processor 1302 (e.g., a central processing unit (CPU), a graphics processing unit (GPU) or both), a main memory 1304 and a static memory 1306, which communicate with each other via an interconnect 1308 (e.g., a link, a bus, etc.). The computer system machine 1300 may further include a video display unit 1310. The computer system machine 1300 may additionally include a storage device 1316 (e.g., a drive unit), a signal generation device 1318 (e.g., a speaker), an output controller 1332, a power management controller 1334, and a network interface device 1320 (which may include or operably communicate with one or more antennas 1330, transceivers, or other wireless communications hardware), and one or more sensors 1328, such as a Global Positioning Sensor (GPS) sensor, compass, location sensor, accelerometer, or other sensor.

The storage device 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304, static memory 1306, and/or within the processor 1302 during execution thereof by the computer system machine 1300, with the main memory 1304, static memory 1306, and the processor 1302 also constituting machine-readable media.

While the machine-readable medium 1322 is illustrated in an example embodiment to be a single medium, the term "machine-readable medium" may include a single medium or multiple media (e.g., a centralized or distributed database, and/or associated caches and servers) that store the one or more instructions 1324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 1324 may further be transmitted or received over a communications network 1326 using a transmission medium via the network interface device 1320 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a system, comprising: a container shaped to contain liquid; a touch-sensitive display disposed on an outer surface of the container to sense swipe patterns; and a user interface module to translate a sensed swipe pattern on the touch-sensitive display into a corresponding interface command.

In Example 2, the subject matter of Example 1 may optionally include wherein the container includes a handle coupled to the outer surface of the container.

In Example 3, the subject matter of any one of Examples 1-2 may optionally include wherein when the container is powered up, the touch-sensitive display displays a root menu; and wherein from the root menu, the user interface module translates a swipe toward or away from the handle into a selection to advance through root icons on the touch-sensitive display, the root icons including an application menu icon and a tool menu icon.

In Example 4, the subject matter of any one of Examples 1-3 may optionally include wherein the user interface module translates a touch on the application menu icon into a selection of an application menu on the touch-sensitive display.

In Example 5, the subject matter of any one of Examples 1-4 may optionally include wherein from the application menu, the user interface module translates a swipe toward or away from the handle into a selection to advance through application icons on the touch-sensitive display.

In Example 6, the subject matter of any one of Examples 1-5 may optionally include wherein from the application menu, the user interface module translates a touch on an application icon into a selection to run a corresponding application on the touch-sensitive display.

In Example 7, the subject matter of any one of Examples 1-6 may optionally include wherein from a running application, the user interface module translates a prolonged touch on the touch-sensitive display into a selection to exit the running application and return to the application menu on the touch-sensitive display.

In Example 8, the subject matter of any one of Examples 1-7 may optionally include wherein from the application menu, the user interface module translates a prolonged touch on the touch-sensitive display into a selection to exit the application menu and return to the root menu on the touch-sensitive display.

In Example 9, the subject matter of any one of Examples 1-8 may optionally include wherein the user interface module translates a touch on the tool menu icon into a selection of a tool menu on the touch-sensitive display.

In Example 10, the subject matter of any one of Examples 1-9 may optionally include wherein from the tool menu, the user interface module translates a swipe toward or away from the handle into a selection to advance through tool icons on the touch-sensitive display.

In Example 11, the subject matter of any one of Examples 1-10 may optionally include wherein from the tool menu, the user interface module translates a touch on a tool icon into a selection to run a corresponding tool on the touch-sensitive display.

In Example 12, the subject matter of any one of Examples 1-11 may optionally include wherein from a running tool, the user interface module translates a prolonged touch on the touch-sensitive display into a selection to exit the running tool and return to the tool menu on the touch-sensitive display.

In Example 13, the subject matter of any one of Examples 1-12 may optionally include wherein from the tool menu, the user interface module translates a prolonged touch on the touch-sensitive display into a selection to exit the tool menu and return to the root menu on the touch-sensitive display.

In Example 14, the subject matter of any one of Examples 1-13 may optionally include wherein the user interface module comprises: a touch panel driver to process a signal from the touch-sensitive display; a normal gesture recognition module to extract a swipe from the processed signal from the touch panel driver; and a container gesture translator to translate the swipe into the corresponding interface command.

In Example 15, the subject matter of any one of Examples 1-14 may optionally include wherein the container is a porcelain mug.

Example 16 is a method for receiving an interface command from a container shaped to contain liquid, the method comprising: sensing a swipe pattern with a touch-sensitive display disposed on an outer surface of the container; and translating the sensed swipe pattern into a corresponding interface command with a user interface module.

In Example 17, the subject matter of Examples 16 may optionally include wherein the container includes a handle coupled to the outer surface of the container.

In Example 18, the subject matter of any one of Examples 16-17 may optionally include wherein when the container is powered up, displaying a root menu on the touch-sensitive display; and further comprising: from the root menu, translating a swipe toward or away from the handle into a selection to advance through root icons on the touch-sensitive display, the root icons including an application menu icon and a tool menu icon.

In Example 19, the subject matter of any one of Examples 16-18 may optionally include translating a touch on the application menu icon into a selection of an application menu on the touch-sensitive display.

In Example 20, the subject matter of any one of Examples 16-19 may optionally include from the application menu, translating a swipe toward or away from the handle into a selection to advance through application icons on the touch-sensitive display.

In Example 21, the subject matter of any one of Examples 16-20 may optionally include from the application menu, translating a touch on an application icon into a selection to run a corresponding application on the touch-sensitive display.

In Example 22, the subject matter of any one of Examples 16-21 may optionally include from a running application, translating a prolonged touch on the touch-sensitive display into a selection to exit the running application and return to the application menu on the touch-sensitive display.

In Example 23, the subject matter of any one of Examples 16-22 may optionally include from the application menu, translating a prolonged touch on the touch-sensitive display into a selection to exit the application menu and return to the root menu on the touch-sensitive display.

In Example 24, the subject matter of any one of Examples 16-23 may optionally include translating a touch on the tool menu icon into a selection of a tool menu on the touch-sensitive display.

In Example 25, the subject matter of any one of Examples 16-24 may optionally include from the tool menu, translating a swipe toward or away from the handle into a selection to advance through tool icons on the touch-sensitive display.

In Example 26, the subject matter of any one of Examples 16-25 may optionally include from the tool menu, translating a touch on a tool icon into a selection to run a corresponding tool on the touch-sensitive display.

In Example 27, the subject matter of any one of Examples 16-26 may optionally include from a running tool, translating a prolonged touch on the touch-sensitive display into a selection to exit the running tool and return to the tool menu on the touch-sensitive display.

In Example 28, the subject matter of any one of Examples 16-27 may optionally include from the tool menu, translating a prolonged touch on the touch-sensitive display into a selection to exit the tool menu and return to the root menu on the touch-sensitive display.

In Example 29, the subject matter of any one of Examples 16-28 may optionally include wherein translating the sensed swipe pattern into a corresponding interface command with a user interface module comprises: processing a signal from the touch-sensitive display; extracting a swipe from the processed signal; and translating the swipe into the corresponding interface command.

In Example 30, the subject matter of any one of Examples 16-29 may optionally include wherein the container is a porcelain mug.

Example 31 is at least one computer readable medium containing program instructions for causing a computer to perform the method of any one of Examples 16-30.

Example 32 is an apparatus having means to perform any of the methods of any one of Examples 16-30.

Example 33 is an apparatus for receiving an interface command from a container shaped to contain liquid, the apparatus comprising: means for displaying images; means for sensing a swipe pattern on the means for displaying; and means for translating the sensed swipe pattern into a corresponding interface command.

In Example 34, the subject matter of Example 33 may optionally include wherein the container includes a handle coupled to the outer surface of the container.

In Example 35, the subject matter of any one of Examples 33-34 may optionally include wherein when the container is powered up, the means for displaying displays a root menu; and wherein from the root menu, the means for translating translates a swipe toward or away from the handle into a toggle between displaying an application menu icon on the means for displaying and displaying a tool menu icon on the means for displaying.

In Example 36, the subject matter of any one of Examples 33-35 may optionally include wherein the means for translating translates a touch on the application menu icon into a selection of an application menu on the means for displaying.

In Example 37, the subject matter of any one of Examples 33-36 may optionally include wherein from the application menu, the means for translating translates a swipe toward or away from the handle into a selection to advance through application icons on the means for displaying.

In Example 38, the subject matter of any one of Examples 33-37 may optionally include wherein from the application menu, the means for translating translates a touch on an application icon into a selection to run a corresponding application on the means for displaying.

In Example 39, the subject matter of any one of Examples 33-38 may optionally include wherein from a running application, the means for translating translates a prolonged touch on the means for sensing into a selection to exit the running application and return to the application menu on the means for displaying.

In Example 40, the subject matter of any one of Examples 33-39 may optionally include wherein from the application menu, the means for translating translates a prolonged touch on the means for sensing into a selection to exit the application menu and return to the root menu on the means for displaying.

In Example 41, the subject matter of any one of Examples 33-40 may optionally include wherein the means for translating translates a touch on the tool menu icon into a selection of a tool menu on the means for displaying.

In Example 42, the subject matter of any one of Examples 33-41 may optionally include wherein from the tool menu, the means for translating translates a swipe toward or away from the handle into a selection to advance through tool icons on the means for displaying.

In Example 43, the subject matter of any one of Examples 33-42 may optionally include wherein from the tool menu, the means for translating translates a touch on a tool icon into a selection to run a corresponding tool on the means for displaying.

In Example 44, the subject matter of any one of Examples 33-43 may optionally include wherein from a running tool, the means for translating translates a prolonged touch on the touch-sensitive display into a selection to exit the running tool and return to the tool menu on the means for displaying.

In Example 45, the subject matter of any one of Examples 33-44 may optionally include wherein from the tool menu, the means for translating translates a prolonged touch on the touch-sensitive display into a selection to exit the tool menu and return to the root menu on the means for displaying.

In Example 46, the subject matter of any one of Examples 33-45 may optionally include wherein the means for translating comprises: means for processing a signal from the means for displaying; means for extracting a swipe from the processed signal; and means for translating the swipe into the corresponding interface command.

Example 47 is a system, comprising: a container shaped to contain liquid; a motion sensor incorporated into the container to sense motion of the container; and a user interface module to translate a sensed motion of the container into a corresponding interface command.

In Example 48, the subject matter of Example 47 may optionally include wherein the container is shaped to define a longitudinal axis, the longitudinal axis being oriented generally vertically when the container is filled with liquid.

In Example 49, the subject matter of any one of Examples 47-48 may optionally include wherein the user interface module translates a swirling motion around the longitudinal axis into a first command; wherein the user interface module translates a movement within a plane perpendicular to the longitudinal axis into a second command; and wherein the user interface module translates a movement along the longitudinal axis into a third command.

In Example 50, the subject matter of any one of Examples 47-49 may optionally further include a display disposed on an outer surface of the container.

In Example 51, the subject matter of any one of Examples 47-50 may optionally include wherein when the container is powered up, the display displays a root menu, the root menu including a plurality of root icons, the root menu highlighting one of the root icons from the plurality.

In Example 52, the subject matter of any one of Examples 47-51 may optionally include wherein from the root menu, the user interface module translates a swirling motion around the longitudinal axis into a selection to highlight a different root icon from the plurality of root icons.

In Example 53, the subject matter of any one of Examples 47-52 may optionally include wherein from the root menu, the user interface module translates a movement within a plane perpendicular to the longitudinal axis into a selection to select the highlighted root icon and perform an action corresponding to the selected root icon.

In Example 54, the subject matter of any one of Examples 47-53 may optionally include wherein the action comprises displaying an application menu on the display, the application menu including a plurality of application icons, the application menu highlighting one of the application icons from the plurality.

In Example 55, the subject matter of any one of Examples 47-54 may optionally include wherein from the application menu, the user interface module translates a swirling motion around the longitudinal axis into a selection to highlight a different application icon from the plurality of application icons.

In Example 56, the subject matter of any one of Examples 47-55 may optionally include wherein from the application menu, the user interface module translates a movement within a plane perpendicular to the longitudinal axis into a selection to select the highlighted application icon and start an application corresponding to the selected application icon.

In Example 57, the subject matter of any one of Examples 47-56 may optionally include wherein when the application is running, the user interface module translates a movement along the longitudinal axis into a selection to exit the application and return to the application menu.

In Example 58, the subject matter of any one of Examples 47-57 may optionally include wherein from the application menu, the user interface module translates a movement along the longitudinal axis into a selection to exit the application menu and return to the root menu.

In Example 59, the subject matter of any one of Examples 47-58 may optionally include wherein the action comprises displaying a tool menu on the display, the tool menu including a plurality of tool icons, the tool menu highlighting one of the tool icons from the plurality.

In Example 60, the subject matter of any one of Examples 47-59 may optionally include wherein from the tool menu, the user interface module translates a swirling motion around the longitudinal axis into a selection to highlight a different tool icon from the plurality of tool icons.

In Example 61, the subject matter of any one of Examples 47-60 may optionally include wherein from the tool menu, the user interface module translates a movement within a plane perpendicular to the longitudinal axis into a selection to select the highlighted tool icon and start a tool corresponding to the selected tool icon.

In Example 62, the subject matter of any one of Examples 47-61 may optionally include wherein when the tool is running, the user interface module translates a movement along the longitudinal axis into a selection to exit the tool and return to the tool menu.

In Example 63, the subject matter of any one of Examples 47-62 may optionally include wherein from the tool menu, the user interface module translates a movement along the longitudinal axis into a selection to exit the tool menu and return to the root menu.

In Example 64, the subject matter of any one of Examples 47-63 may optionally include wherein the motion sensor comprises at least one of an accelerometer, a capacitive element to sense a motion relative to a base, a video sensor disposed on or in the container, or a video sensor disposed away from the container and having a field of view that includes the container.

Example 65 is a method for receiving an interface command from a container shaped to contain liquid, the method comprising: sensing a motion of the container with a motion sensor disposed on or in the container; and translating the sensed motion into a corresponding interface command.

In Example 66, the subject matter of Example 65 may optionally include wherein the container is shaped to define a longitudinal axis, the longitudinal axis being oriented generally vertically when the container is filled with liquid.

In Example 67, the subject matter of any one of Examples 65-66 may optionally include translating a swirling motion around the longitudinal axis into a first command.

In Example 68, the subject matter of any one of Examples 65-67 may optionally include translating a movement within a plane perpendicular to the longitudinal axis into a second command.

In Example 69, the subject matter of any one of Examples 65-68 may optionally include translating a movement along the longitudinal axis into a third command.

In Example 70, the subject matter of any one of Examples 65-69 may optionally include wherein when the container is powered up, displaying a root menu on the display, the root menu including a plurality of root icons, the root menu highlighting one of the root icons from the plurality.

In Example 71, the subject matter of any one of Examples 65-70 may optionally include from the root menu, translating a swirling motion around the longitudinal axis into a selection to highlight a different root icon from the plurality of root icons.

In Example 72, the subject matter of any one of Examples 65-71 may optionally include from the root menu, translating a movement within a plane perpendicular to the longitudinal axis into a selection to select the highlighted root icon and perform an action corresponding to the selected root icon.

In Example 73, the subject matter of any one of Examples 65-72 may optionally include wherein the action comprises displaying an application menu on the display, the application menu including a plurality of application icons, the application menu highlighting one of the application icons from the plurality.

In Example 74, the subject matter of any one of Examples 65-73 may optionally include from the application menu, translating a swirling motion around the longitudinal axis into a selection to highlight a different application icon from the plurality of application icons.

In Example 75, the subject matter of any one of Examples 65-74 may optionally include from the application menu, translating a movement within a plane perpendicular to the longitudinal axis into a selection to select the highlighted application icon and start an application corresponding to the selected application icon.

In Example 76, the subject matter of any one of Examples 65-75 may optionally include when the application is running, translating a movement along the longitudinal axis into a selection to exit the application and return to the application menu.

In Example 77, the subject matter of any one of Examples 65-76 may optionally include from the application menu, translating a movement along the longitudinal axis into a selection to exit the application menu and return to the root menu.

In Example 78, the subject matter of any one of Examples 65-77 may optionally include wherein the action comprises displaying a tool menu on the display, the tool menu including a plurality of tool icons, the tool menu highlighting one of the tool icons from the plurality.

In Example 79, the subject matter of any one of Examples 65-78 may optionally include from the tool menu, translating a swirling motion around the longitudinal axis into a selection to highlight a different tool icon from the plurality of tool icons.

In Example 80, the subject matter of any one of Examples 65-79 may optionally include from the tool menu, translating a movement within a plane perpendicular to the longitudinal axis into a selection to select the highlighted tool icon and start a tool corresponding to the selected tool icon.

In Example 81, the subject matter of any one of Examples 65-80 may optionally include when the tool is running, translating a movement along the longitudinal axis into a selection to exit the tool and return to the tool menu.

In Example 82, the subject matter of any one of Examples 65-81 may optionally include from the tool menu, translating a movement along the longitudinal axis into a selection to exit the tool menu and return to the root menu.

Example 83 is at least one computer readable medium containing program instructions for causing a computer to perform the method of any one of Examples 65-82.

Example 84 is an apparatus having means to perform any of the methods of any one of Examples 65-82.

Example 85 is an apparatus for receiving an interface command from a container shaped to contain liquid, the apparatus comprising: means for sensing a motion of the container; and means for translating the sensed motion into a corresponding interface command with a user interface module.

In Example 86, the subject matter of Examples 85 may optionally include wherein the container is shaped to define a longitudinal axis, the longitudinal axis being oriented generally vertically when the container is filled with liquid.

In Example 87, the subject matter of any one of Examples 85-86 may optionally include means for translating a swirling motion around the longitudinal axis into a first command.

In Example 88, the subject matter of any one of Examples 85-87 may optionally include means for translating a movement within a plane perpendicular to the longitudinal axis into a second command.

In Example 89, the subject matter of any one of Examples 85-88 may optionally include means for translating a movement along the longitudinal axis into a third command.

In Example 90, the subject matter of any one of Examples 85-89 may optionally include wherein when the container is powered up, the display displays a root menu, the root menu including a plurality of root icons, the root menu highlighting one of the root icons from the plurality.

In Example 91, the subject matter of any one of Examples 85-90 may optionally include means for translating a swirling motion around the longitudinal axis, from the root menu, into a selection to highlight a different root icon from the plurality of root icons.

In Example 92, the subject matter of any one of Examples 85-91 may optionally include means for translating a movement within a plane perpendicular to the longitudinal axis, from the root menu, into a selection to select the highlighted root icon and perform an action corresponding to the selected root icon.

In Example 93, the subject matter of any one of Examples 85-92 may optionally include wherein the action comprises displaying an application menu on the display, the application menu including a plurality of application icons, the application menu highlighting one of the application icons from the plurality.

In Example 94, the subject matter of any one of Examples 85-93 may optionally include means for translating a swirling motion around the longitudinal axis, from the application menu, into a selection to highlight a different application icon from the plurality of application icons.

In Example 95, the subject matter of any one of Examples 85-94 may optionally include means for translating a movement within a plane perpendicular to the longitudinal axis, from the application menu, into a selection to select the highlighted application icon and start an application corresponding to the selected application icon.

In Example 96, the subject matter of any one of Examples 85-95 may optionally include means for translating a movement along the longitudinal axis, when the application is running, into a selection to exit the application and return to the application menu.

In Example 97, the subject matter of any one of Examples 85-96 may optionally include translating a movement along the longitudinal axis, from the application menu, into a selection to exit the application menu and return to the root menu.

In Example 98, the subject matter of any one of Examples 85-97 may optionally include wherein the action comprises displaying a tool menu on the display, the tool menu including a plurality of tool icons, the tool menu highlighting one of the tool icons from the plurality.

In Example 99, the subject matter of any one of Examples 85-98 may optionally include means for translating a swirling motion around the longitudinal axis, from the tool menu, into a selection to highlight a different tool icon from the plurality of tool icons.

In Example 100, the subject matter of any one of Examples 85-99 may optionally include means for translating a movement within a plane perpendicular to the longitudinal axis, from the tool menu, into a selection to select the highlighted tool icon and start a tool corresponding to the selected tool icon.

In Example 101, the subject matter of any one of Examples 85-100 may optionally include means for translating a movement along the longitudinal axis, when the tool is running, into a selection to exit the tool and return to the tool menu.

In Example 102, the subject matter of any one of Examples 85-101 may optionally include means for translating a movement along the longitudinal axis, from the tool menu, into a selection to exit the tool menu and return to the root menu.

In Example 103, the subject matter of any one of Examples 1-15 may optionally include wherein the touch-sensitive display comprises: a touch-sensitive element accessible from the outer surface of the container.

In Example 104, the subject matter of Example 103 may optionally include wherein the touch-sensitive element is disposed on the outer surface of the container.

In Example 105, the subject matter of Example 103 may optionally include wherein the touch-sensitive element is disposed below the outer surface of the container and included in a wall of the container.

In Example 106, the subject matter of any one of Examples 103-105 may optionally include wherein the touch-sensitive display further comprises: an array of light-emitting diodes (LEDs) disposed below the touch sensitive element and included in a wall of the container, the touch-sensitive element and the outer surface of the container being sufficiently thin to transmit light from the LEDs therethrough when the array is operational, the touch-sensitive element and the outer surface of the container being sufficiently thick to mask the array of LEDs when the array is non-operational.

In Example 107, the subject matter of any one of Examples 103-106 may optionally include wherein the touch-sensitive display further comprises: an LED holder disposed below the array of LEDs and included in a wall of the container.

In Example 108, the subject matter of any one of Examples 103-107 may optionally further include electronics disposed on or in the container; wherein the electronics, when operational: receive input and output from the touch-sensitive display; drive the LEDs in the array; and rechargeably store energy to power the touch-sensitive display and the LED array.

In Example 109, the subject matter of any one of Examples 47-64 may optionally further include a touch-sensitive element accessible from the outer surface of the container.

In Example 110, the subject matter of Example 109 may optionally include wherein the touch-sensitive element is disposed on the outer surface of the container.

In Example 111, the subject matter of Example 109 may optionally include wherein the touch-sensitive element is disposed below the outer surface of the container and included in a wall of the container.

In Example 112, the subject matter of any one of Examples 109-111 may optionally include wherein the touch-sensitive display further comprises: an array of light-emitting diodes (LEDs) disposed below the touch sensitive element and included in a wall of the container, the touch-sensitive element and the outer surface of the container being sufficiently thin to transmit light from the LEDs therethrough when the array is operational, the touch-sensitive element and the outer surface of the container being sufficiently thick to mask the array of LEDs when the array is non-operational.

In Example 113, the subject matter of any one of Examples 109-112 may optionally further include an LED holder disposed below the array of LEDs and included in a wall of the container.

In Example 114, the subject matter of any one of Examples 109-113 may optionally further include electronics disposed on or in the container; wherein the electronics, when operational: receive input and output from the motion sensor; receive input and output from the touch-sensitive display; drive the LEDs in the array; and rechargeably store energy to power the touch-sensitive display and the LED array.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system, comprising:
   a container shaped to contain liquid;
   a touch-sensitive display disposed on an outer surface of the container to sense swipe patterns, wherein the touch-sensitive display comprises a touch sensitive element accessible from the outer surface of the container, and an array of light-emitting diodes (LEDs) disposed below the touch sensitive element and included in a wall of the container, the touch-sensitive element and the outer surface of the container being sufficiently thin to transmit light from the LEDs therethrough when the array is operational, the touch-sensitive element and the outer surface of the container being sufficiently thick to mask the array of LEDs when the array is non-operational; and
   a user interface module to translate a sensed swipe pattern on the touch-sensitive display into a corresponding interface command.

2. The system of claim 1, wherein the container includes a handle coupled to the outer surface of the container.

3. The system of claim 2,
   wherein when the container is powered up, the touch-sensitive display displays a root menu; and
   wherein from the root menu, the user interface module translates a swipe toward or away from the handle into a selection to advance through root icons on the touch-sensitive display, the root icons including an application menu icon and a tool menu icon.

4. The system of claim 3, wherein the user interface module translates a touch on the application menu icon into a selection of an application menu on the touch-sensitive display.

5. The system of claim 4, wherein from the application menu, the user interface module translates a swipe toward or away from the handle into a selection to advance through application icons on the touch-sensitive display.

6. The system of claim 4, wherein from the application menu, the user interface module translates a touch on an application icon into a selection to run a corresponding application on the touch-sensitive display.

7. The system of claim 6, wherein from a running application, the user interface module translates a prolonged touch on the touch-sensitive display into a selection to exit the running application and return to the application menu on the touch-sensitive display.

8. The system of claim 4, wherein from the application menu, the user interface module translates a prolonged touch on the touch-sensitive display into a selection to exit the application menu and return to the root menu on the touch-sensitive display.

9. The system of claim 3, wherein the user interface module translates a touch on the tool menu icon into a selection of a tool menu on the touch-sensitive display.

10. The system of claim 9,
    wherein from the tool menu, the user interface module translates a swipe toward or away from the handle into a selection to advance through tool icons on the touch-sensitive display;
    wherein from the tool menu, the user interface module translates a touch on a tool icon into a selection to run a corresponding tool on the touch-sensitive display; and
    wherein from the tool menu, the user interface module translates a prolonged touch on the touch-sensitive display into a selection to exit the tool menu and return to the root menu on the touch-sensitive display.

11. The system of claim 10, wherein from a running tool, the user interface module translates a prolonged touch on the touch-sensitive display into a selection to exit the running tool and return to the tool menu on the touch-sensitive display.

12. The system of claim 1, wherein the user interface module comprises:
a touch panel driver to process a signal from the touch-sensitive display;
a normal gesture recognition module to extract a swipe from the processed signal from the touch panel driver; and
a container gesture translator to translate the extracted swipe into the corresponding interface command.

13. The system of claim 1, wherein the container is a porcelain mug.

14. The system of claim 1, wherein the touch-sensitive element is disposed on the outer surface of the container.

15. The system of claim 1, wherein the touch-sensitive element is disposed below the outer surface of the container and included in a wall of the container.

16. The system of claim 1, wherein the touch-sensitive display further comprises:
an LED holder disposed below the array of LEDs and included in a wall of the container.

17. The system of claim 1, further comprising:
electronics disposed on or in the container;
wherein the electronics, when operational:
receive input and output from the touch-sensitive display;
control the illumination of the LEDs in the array; and
store energy in a battery to power the touch-sensitive display and the array of LEDs.

18. A method for receiving an interface command from a container shaped to contain liquid, the method comprising:
sensing a swipe pattern with a touch-sensitive display disposed on an outer surface of the container, wherein the touch-sensitive display comprises a touch sensitive element accessible from the outer surface of the container, and an array of light-emitting diodes (LEDs) disposed below the touch sensitive element and included in a wall of the container, the touch-sensitive element and the outer surface of the container being sufficiently thin to transmit light from the LEDs therethrough when the array is operational, the touch-sensitive element and the outer surface of the container being sufficiently thick to mask the array of LEDs when the array is non-operational; and
translating the sensed swipe pattern into a corresponding interface command with a user interface module.

19. The method of claim 18, wherein the container includes a handle coupled to the outer surface of the container.

20. The method of claim 19, wherein when the container is powered up, displaying a root menu on the touch-sensitive display; and further comprising:
from the root menu, translating a swipe toward or away from the handle into a selection to advance through root icons on the touch-sensitive display, the root icons including an application menu icon and a tool menu icon.

21. The method of claim 20, further comprising:
translating a touch on the application menu icon into a selection of an application menu on the touch-sensitive display.

22. The method of claim 21, further comprising:
from the application menu, translating a swipe toward or away from the handle into a selection to advance through application icons on the touch-sensitive display.

23. The method of claim 21, further comprising:
from the application menu, translating a touch on an application icon into a selection to run a corresponding application on the touch-sensitive display.

24. The method of claim 21, further comprising:
from the application menu, translating a prolonged touch on the touch-sensitive display into a selection to exit the application menu and return to the root menu on the touch-sensitive display.

25. The method of claim 21, further comprising:
translating a prolonged touch on the touch-sensitive display into a selection to exit a running application; and
displaying the application menu on the touch-sensitive display.

26. The method of claim 18, wherein translating the sensed swipe pattern into a corresponding interface command with a user interface module comprises:
processing a signal from the touch-sensitive display;
extracting a swipe from the processed signal; and
translating the swipe into the corresponding interface command.

* * * * *